(12) United States Patent
Wang et al.

(10) Patent No.: US 10,407,219 B2
(45) Date of Patent: Sep. 10, 2019

(54) BARRIER TUBE SHOULDERS

(71) Applicant: COLGATE-PALMOLIVE COMPANY, New York, NY (US)

(72) Inventors: Jun Wang, Fort Washington, PA (US); Christopher J. Miller, Flemington, NJ (US); Scott Beckerman, Jersey City, NJ (US); Sunil Shah, Branchburg, NJ (US)

(73) Assignee: Colgate-Palmolive Company, New York, NY (US)

( * ) Notice: Subject to any disclaimer, the term of this patent is extended or adjusted under 35 U.S.C. 154(b) by 854 days.

(21) Appl. No.: 14/807,424

(22) Filed: Jul. 23, 2015

(65) Prior Publication Data

US 2017/0021976 A1 Jan. 26, 2017

(51) Int. Cl.
*B65D 35/10* (2006.01)
*B29C 49/22* (2006.01)
*B29C 49/48* (2006.01)
*B65D 35/12* (2006.01)
*B65D 35/14* (2006.01)
(Continued)

(52) U.S. Cl.
CPC ............. *B65D 35/10* (2013.01); *B29C 49/04* (2013.01); *B29C 49/22* (2013.01); *B29C 49/4278* (2013.01); *B29C 49/48* (2013.01); *B65D 35/12* (2013.01); *B65D 35/14* (2013.01); *B65D 35/44* (2013.01); *B29C 2049/048* (2013.01); *B29C 2049/4869* (2013.01); *B29C 2049/4871* (2013.01); *B29C 2049/4884* (2013.01); *B29C 2791/001* (2013.01); *B29C 2793/009* (2013.01); *B29C 2793/0027* (2013.01); *B29D 23/20* (2013.01); *B29K 2023/065* (2013.01);
(Continued)

(58) Field of Classification Search
None
See application file for complete search history.

(56) References Cited

U.S. PATENT DOCUMENTS 4,522,775 A    6/1985   Briggs et al.
4,990,382 A * 2/1991   Weissenstein ......... B29C 49/22
                                                          428/35.7

(Continued)

FOREIGN PATENT DOCUMENTS

WO   WO 02/38360    5/2002
WO   WO 03/055664   7/2003
(Continued)

OTHER PUBLICATIONS

International Search Report and Written Opinion for priority application No. PCT/US 2016/043842, dated Nov. 8, 2016.

*Primary Examiner* — Monica A Huson

(57) ABSTRACT

Provided is a method for making barrier tube shoulders. The method includes forming a parison from a multi-layer laminated structure having an inner layer that faces an interior of the parison, an outer layer comprising an exterior surface of the parison, and an interdisposed layer between the inner layer and the outer layer, wherein the interdisposed layer is a flavor barrier layer. The method also includes providing an extrusion blow molding (EBM) mold comprising at least one cavity shaped as a barrier tube shoulder, positioning the parison in the EBM mold, and blow molding the parison such that the parison substantially conforms to the EBM mold to form a barrier tube shoulder having the barrier layer.

17 Claims, 10 Drawing Sheets

(51) Int. Cl.
    *B65D 35/44*     (2006.01)
    *B29C 49/04*     (2006.01)
    *B29C 49/42*     (2006.01)
    *B29K 23/00*     (2006.01)
    *B29K 105/00*    (2006.01)
    *B29L 23/20*     (2006.01)
    *B29L 31/00*     (2006.01)
    *B29D 23/20*     (2006.01)

(52) U.S. Cl.
    CPC ..... *B29K 2105/258* (2013.01); *B29L 2023/20* (2013.01); *B29L 2031/712* (2013.01)

(56) References Cited

U.S. PATENT DOCUMENTS 5,712,009 A * 1/1998 Moore .................... B32B 27/08
                                                        428/35.7
7,897,222 B2    3/2011 Witz et al.

FOREIGN PATENT DOCUMENTS

| WO | WO 2004/071880 | 8/2004 |
|----|----------------|--------|
| WO | WO 2006/000329 | 1/2006 |

\* cited by examiner

BARRIER TUBE SHOULDERS

BACKGROUND

Tube containers, such as dispensing tubes, are used for storing and dispensing a wide range of products. These include adhesives, lubricants, lotions, medicants, shampoos, hair dressings, and various oral care products, like toothpaste. A problem with such products is that ingredients such as flavors and fragrances may be absorbed, adsorbed, or otherwise degraded by the tube materials or permeate through the tube materials. Some package materials absorb/adsorb flavor and fragrance components in an undesirable manner that may depend on the particular flavor and fragrance molecules. Also, different flavor and fragrance molecules permeate through the package materials at different rates and the taste and/or olfactory properties of the product are changed, often in an unwanted way. One solution for minimizing flavor loss is to modify the tube structure by adding a barrier layer or barrier material to reduce or to eliminate the permeation and the absorption or adsorption by the tube structure of such ingredients. Conventionally, a barrier layer is selected based on its flavor and/or fragrance barrier properties The shoulder and nozzle of a tube are relatively thick compared to the remainder of a tube in order to maintain the mechanical strength of the tube. Further, in order to have good adhesion or connection of the tube body to the shoulder, and for cost considerations, polyolefins are usually used as the material for the tube shoulder. Because of these properties, the tube shoulder portion of the tubes may poses additional problems with respect to flavor compound loss, because the greater the thickness of the polymers, the greater the absorption. The greater thickness of a tube shoulder leads to an unacceptable level of flavor compound absorption. Additionally, polyolefins do not function as adequate barriers for flavor molecules because flavor molecules can permeate easily through the polyolefins.

Attempts to solve this problem have been made with respect to flavor retention. For example, an insert made of a material that has a high barrier property for the flavor components, such as polyethylene terephthalate (PET), has been used. This insert can be formed by any of several techniques, such as an interference fit into the top part of the tube, or as a film layer onto the inner surface of the tube. However, the use of inserts requires additional manufacturing steps and increases the material cost. In other prior art, a barrier layer (e.g., an ethylene vinyl alcohol—EVOH—or nylon layer) that is co-injection molded in between the shoulder material, high-density polyethylene (HDPE). In these cases, PET is difficult to co-injection mold with PE due to their very different processing temperatures, and while EVOH/nylon can be co-injection molded, they are moisture sensitive and are therefore not co-injected as an inner layer, but are instead formed as a layer buried in PE. However, this involves using a more expensive injection molding machine as well as a more costly injection mold via a complicated injection molding process with a higher molding cycle time, both of which add costs.

It is desirable to provide dispensing tubes that provide performance equal to or better than existing tubes, but which minimize these drawbacks, which reduce the quality of the product in the tube, and which reduce manufacturing costs and operational steps for producing the tube.

BRIEF SUMMARY

In an embodiment there is a method for making barrier tube shoulders in an extrusion blow molding (EBM) process. The method includes forming a parison from a multi-layer laminated structure having an inner layer that faces an interior of the parison, an outer layer comprising an exterior surface of the parison, and at least one interdisposed layer between the inner layer and the outer layer, wherein the interdisposed layer is a flavor barrier layer. The method also includes providing an EBM mold comprising at least one cavity shaped as a barrier tube shoulder, positioning the parison in the EBM mold, and blow molding the parison such that the parison substantially conforms to the EBM mold to form a barrier tube shoulder having the barrier layer.

In another method there is a tube structure for storing and dispensing dental care products. The tube structure comprises a tube body having a closed end and an open end; and a barrier tube shoulder attached at the open end of the tube body, wherein the barrier tube shoulder comprises an extrusion blow-molded multi-layer laminated structure comprising a barrier material.

In yet another embodiment, there is a method for making a toothpaste tube having a barrier tube shoulders. The method includes forming a parison from a multi-layer laminated structure having an inner layer that faces an interior of the parison, an outer layer comprising an exterior surface of the parison, and an interdisposed layer between the inner layer and the outer layer, wherein the interdisposed layer is a flavor barrier layer. The method also includes providing an extrusion blow molding (EBM) mold comprising at least one cavity shaped as a barrier tube shoulder and at least one spacer-shaped cavity, positioning the parison in the EBM mold, and blow molding the parison such that the parison substantially conforms to the EBM mold to form at least one extrusion-blow-molded barrier tube shoulder having the barrier layer and at least one spacer wall structure. The method also includes separating the at least one extrusion-blow-molded barrier tube shoulder from the at least one spacer wall structure, providing a tube body having an open end, and attaching the at least one extrusion-low-molded barrier tube shoulder on the open end of the tube body.

In still another embodiment, there is an article. The article includes a multi-layer laminated structure defining a first barrier-tube-shoulder-shaped portion, a second barrier-tube-shoulder-shaped portion, and a cavity extending between the first barrier-tube-shoulder-shaped portion and the second barrier-tube-shoulder-shaped portion. The multi-layer laminated structure comprises an inner layer, an outer layer, and an interdisposed layer between the inner layer and the outer layer, wherein the interdisposed layer is a flavor barrier layer.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

The following description of the preferred embodiments is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

As used herein, the term "barrier tube shoulder" refers to the shoulder and nozzle portions of a tube container as one part.

Embodiments described herein include an extrusion blow molding (EBM) process for making multiple barrier tube shoulders from multi-layer laminated structures, for example, from co-extruded layers laminated one over the other, for example in an extrusion blow molding machine. Generally, an EBM mold of an embodiment contains a plurality of cavities, each of which contains a plurality of interconnected barrier-tube-shoulder-shaped cavities. After blow molding portions of the multi-layer laminated structure into at least one barrier tube comprising a barrier material in the EBM mold, the molded barrier tube shoulders are trimmed of excess portions of the multi-layer barrier laminated structure. The extrusion-blow-molded barrier tube shoulder is provided for use in a tube-making process wherein the extrusion-blow-molded barrier tube shoulder is attached to a tube body.

Figure 1:
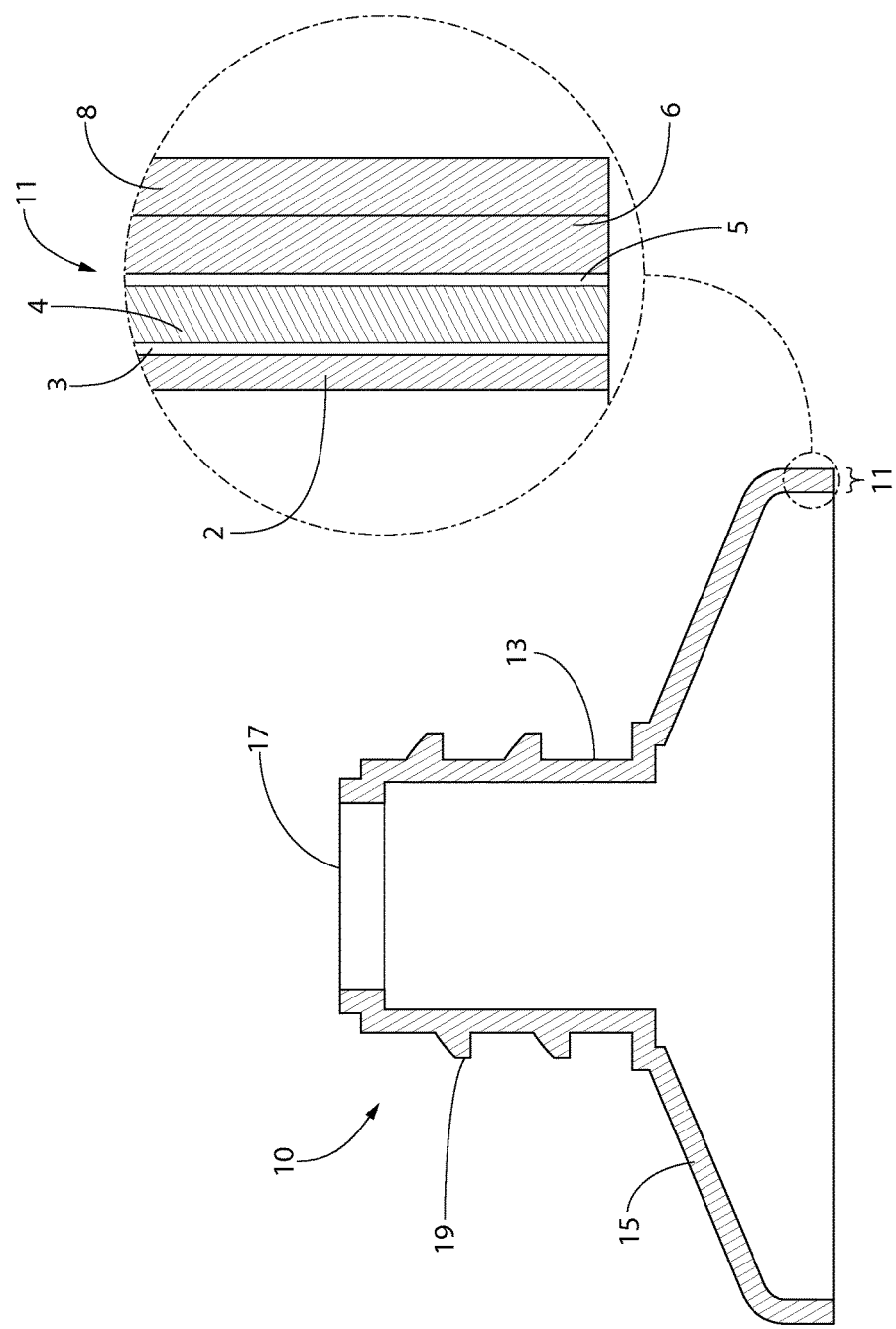
FIG. 1 is a side elevation view of an example of a tube shoulder including an inset showing a zoomed in view of a portion of the tube shoulder.

FIG. 1 shows an extruded and blow-molded multi-layer barrier laminated structure 11 extrusion blow molded as a barrier tube shoulder 10. The barrier tube shoulder 10 comprises a nozzle portion 13 and a shoulder portion 15. The nozzle portion 13 has an aperture 17 and threads 19 for the attachment of a closure article, such as a cap. The multi-layer barrier laminated structure 11 can comprise at least two layers, for example at least two coextruded layers. The multi-layer barrier laminated structure 11 may include a plurality of layers, such as a plurality of coextruded layers. The plurality of layers can include an innermost layer 2, a first interdisposed layer 4 and an outermost layer 8. The plurality of layers may optionally include a second interdisposed layer 6 disposed between the first interdisposed layer 4 and the outermost layer 8. As shown in FIG. 1, the first interdisposed layer 4 may disposed between the innermost layer 2 and the outermost layer 8. An adhesive layer 3 may be disposed between the innermost layer 2 and the first interdisposed layer 4. An adhesive layer 5 may be disposed between the first interdisposed layer 4 and the second interdisposed layer 6. The second interdisposed layer 6 and the outer layer 8 may be fused together by at least partially melting them at an interface. Accordingly, the second interdisposed layer 6 and the outer layer 8 may comprise the same material but may be formed together during a co-extrusion process. At least one of the layers of the multi-layer barrier laminated structure may function as a barrier layer. For example, any one or more of the inner layer 2, first interdisposed layer 4, second interdisposed layer 6, and outermost layer 8 may function as a barrier layer. In an example, the first interdisposed layer may function as a flavor barrier, an oxygen barrier, or both. In an example, the innermost layer 2, the second interdisposed layer and/or the outermost layer 8 may function as a moisture barrier.

Figure 2:
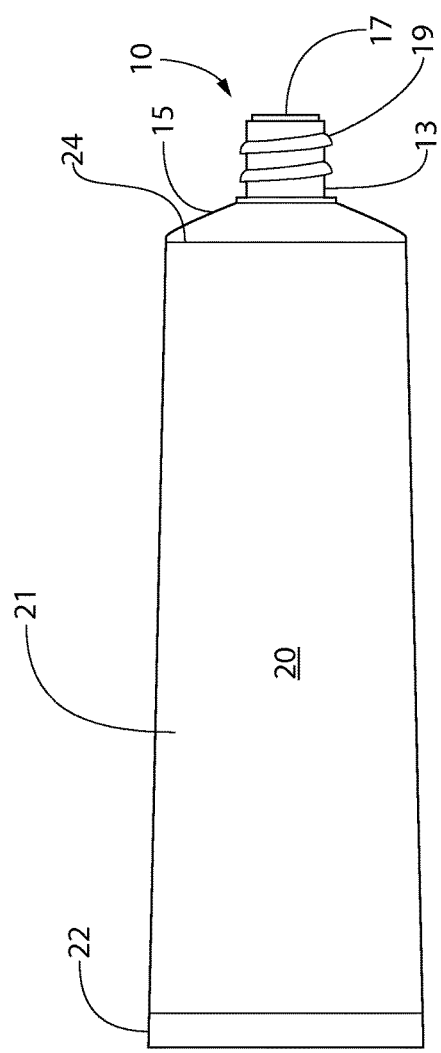
FIG. 2 is a side elevation view of an assembled tube with the tube shoulder of FIG. 1.

FIG. 2 shows a tube body 20 with a tube portion 21 and a tube portion closing crimp 22. The tube body is shown with the barrier tube shoulder 10 attached or joined at its open end by attachment seal 24 which may be formed, for example, by heat-sealing. The tube body 20 can comprise any of the known tube structures disclosed and/or used in the prior art. Typically, each of the tube body structures will be a multi-layer laminated structure comprising an inner barrier layer made of a metal foil, a polyester, polyamide, or an ethylene vinyl alcohol copolymer. The tube body 20 can define an internal volume, which may be filled with any flowable material or product (e.g., adhesives, lubricants, lotions, medicants, shampoos, hair dressings, oral care products like toothpaste, edible products like ketchup, and other materials that are typically dispensed via tubes). The internal volume may be any volume capable of storing flowable material, but preferably should be a volume that consumers find acceptable for day-to-day use. In an example, the volume may be less than or equal to about 50 ml, for example from about 20 ml to about 50 ml.

The barrier tube shoulder 10 can be formed from resin materials extruded into the form of a multi-layer barrier laminated structure and molded into a predetermined shape. In various embodiments, the extruded multi-layer barrier laminated structure may include at least one barrier material as one of the multi-layers. Exemplary barrier materials may function to prevent or minimize moisture loss and/or flavor loss. In one exemplary configuration, the innermost layer 2 that contacts the product within the tube body 20 may include a barrier material that functions to prevent moisture loss, the first interdisposed layer may include a barrier material that functions to prevent flavor loss, and/or the outermost layer may include a barrier material that functions to prevent moisture loss. In such embodiments, no additional barrier layer, such as a separate barrier layer insert, is required to be added after molding the tube shoulder, for example, added to an inner surface of the tube shoulder. In various embodiments, barrier properties that prevent or reduce flavor and/or fragrance losses may be incorporated into the barrier tube shoulder as it is extruded and subsequently molded into its final form. Additionally, in an embodiment, both innermost layer 2 and outermost layer 2 may include a material that functions as a moisture barrier. Thus, innermost layer 2 may function to minimize moisture loss from out of the tube body while outermost layer 2 may function to minimize ambient moisture from penetrating into the tube body. However, some materials that function as a moisture barrier absorbs flavor molecules. Thus, to minimize such flavor molecule absorption, a thickness of innermost layer 2 may be minimized and may be less than a thickness of the outermost layer 8.

An exemplary multi-layer barrier laminated structure 11 may have a total thickness selected from the range of from about 500 µm to about 2000 µm. A thickness of innermost layer 2 may be selected from the range of from about 30 µm to about 100 µm. A thickness of first interdisposed layer 4 may be selected from the range of from about 5 µm to about 30 µm. Adhesive layers 3 and 5 may each have a respective thickness selected from the range of from about 10 µm to about 40 µm. Outer layer 8 and second interdisposed layer 6 may each have a respective thickness selected from the range of from about 300 µm to about 900 µm.

Figure 3A:
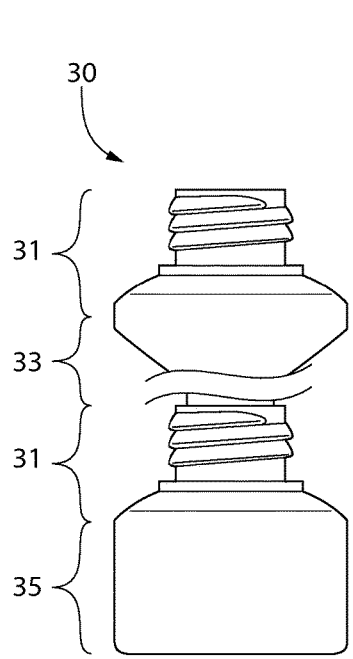
FIGS. 3A-3B are illustrations showing examples of features of an EBM mold that comprises at least one barrier-tube-shoulder-shaped cavity, at least one spacer-shaped cavity and an end spacer-shaped cavity.
Figure 3B:
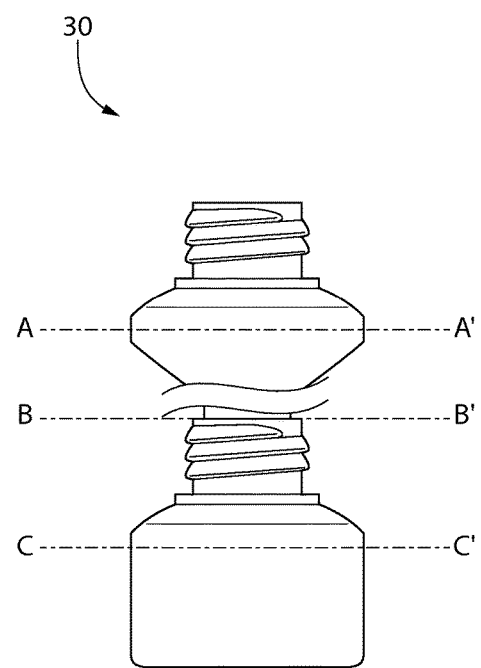
Figure 4:
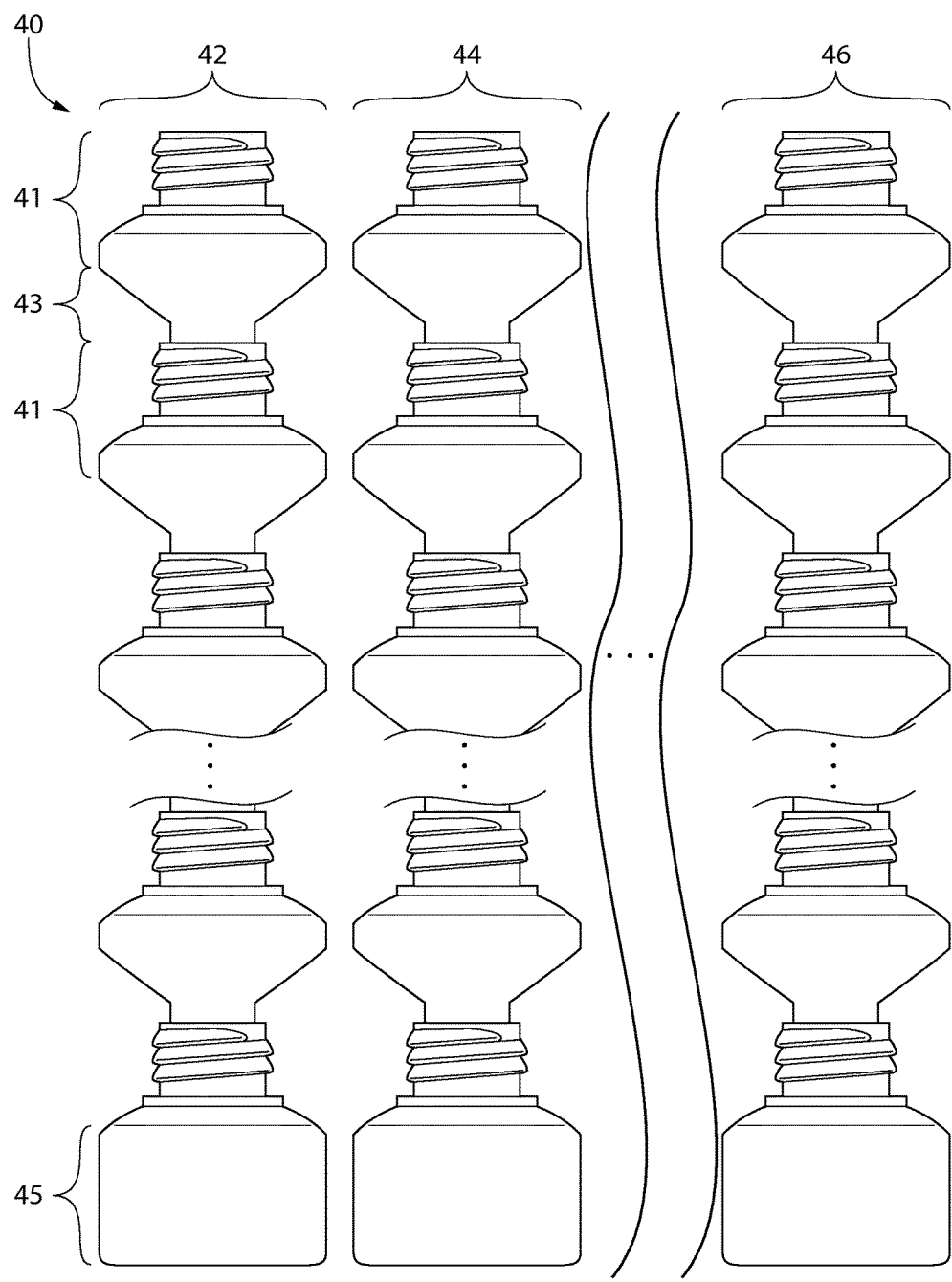
FIG. 4 is an illustration of examples of multiple EBM molds that may be used together in a high-volume EBM process for making barrier tube shoulders.

In an embodiment, an EBM mold for forming barrier tube shoulders in an EBM process includes at least one cavity that comprises a shape of the barrier tube shoulder 10 (i.e., a barrier-tube-shoulder-shaped cavity). For example, FIGS. 3A-3B and 4 show a simplified view of an example of EBM molds 30 and 40 that include a plurality of interconnected cavities, which in the example shown in FIGS. 3A-3B are two interconnected cavities. The plurality of interconnected cavities may be viewed as a single continuous cavity extending between the interconnected cavities. That is, the single continuous cavity extends between an open end and a closed end of the EBM mold. The single continuous cavity comprises empty space.

The plurality of interconnected cavities may comprise at least one barrier-tube-shoulder-shaped cavity 31, 41 in which a portion of a parison may be blow molded into a tube barrier shoulder. The plurality of cavities may also comprise at least one spacer-shaped cavity 33, 43 in which another portion of the parison may be blow molded into spacers as described below. The spacer-shaped cavities 33, 43 may be disposed along the EBM mold 30, 40 at locations that separate adjacent barrier-tube-shoulder-shaped cavities 31, 41. One of the spacer-shaped cavities comprises a closed end of the EBM mold. Thus, the spacer-shaped cavity 35, 45 of the EBM mold may accept a closed-off end of a parison as described further below. Lines A-A' indicate where a barrier-tube-shoulder-shaped cavity 31 ends and where a spacer-shaped cavity 33 begins. Line B-B' indicates where the spacer-shaped cavity 33 ends and where another barrier-tube-shoulder-shaped cavity 31 begins. Line C-C' indicates where a second barrier-tube-shoulder-shaped cavity 31 ends and where the spacer-shaped cavity 35 begins.

The EBM method of the embodiments may require blow molding of a plurality of multi-layer barrier laminates. Accordingly, a plurality of EBM molds may be provided. Each EBM mold may comprise any number of interconnected cavities other than the two shown for EBM mold 30.

Figure 5A:
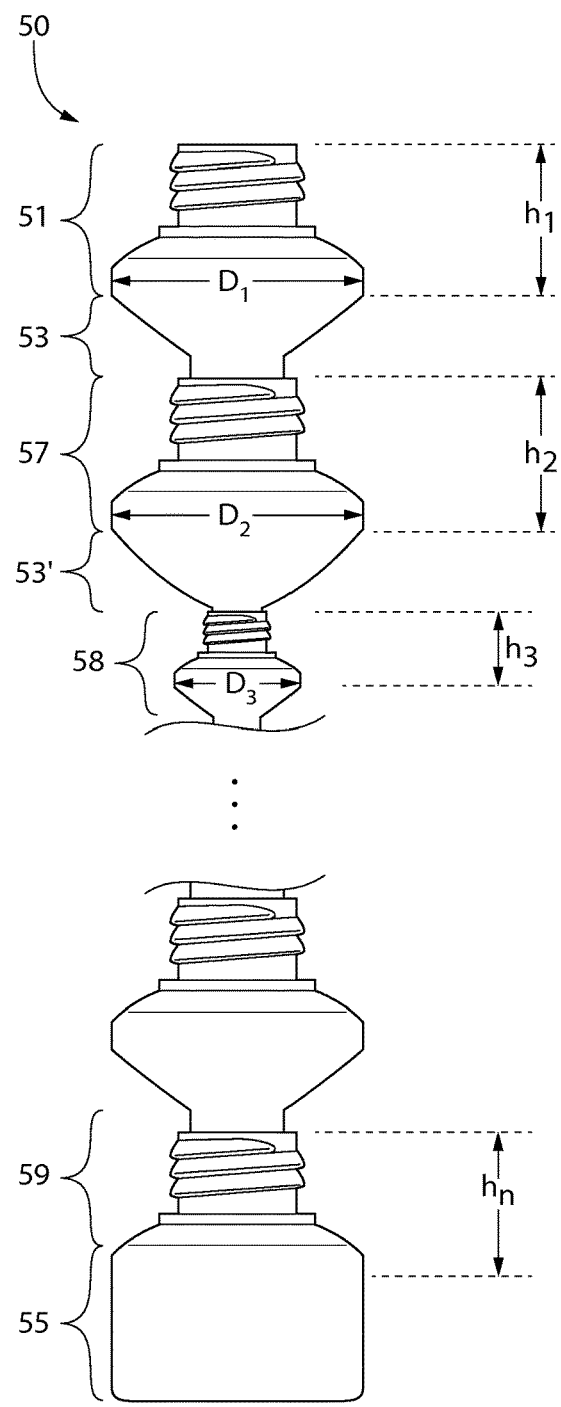
FIG. 5A is an illustration showing an example of an EBM mold of another embodiment that includes barrier-tube-shoulder-shaped cavities and spacer-shaped cavities having different sizes, shapes, and designs.
Figure 5B:
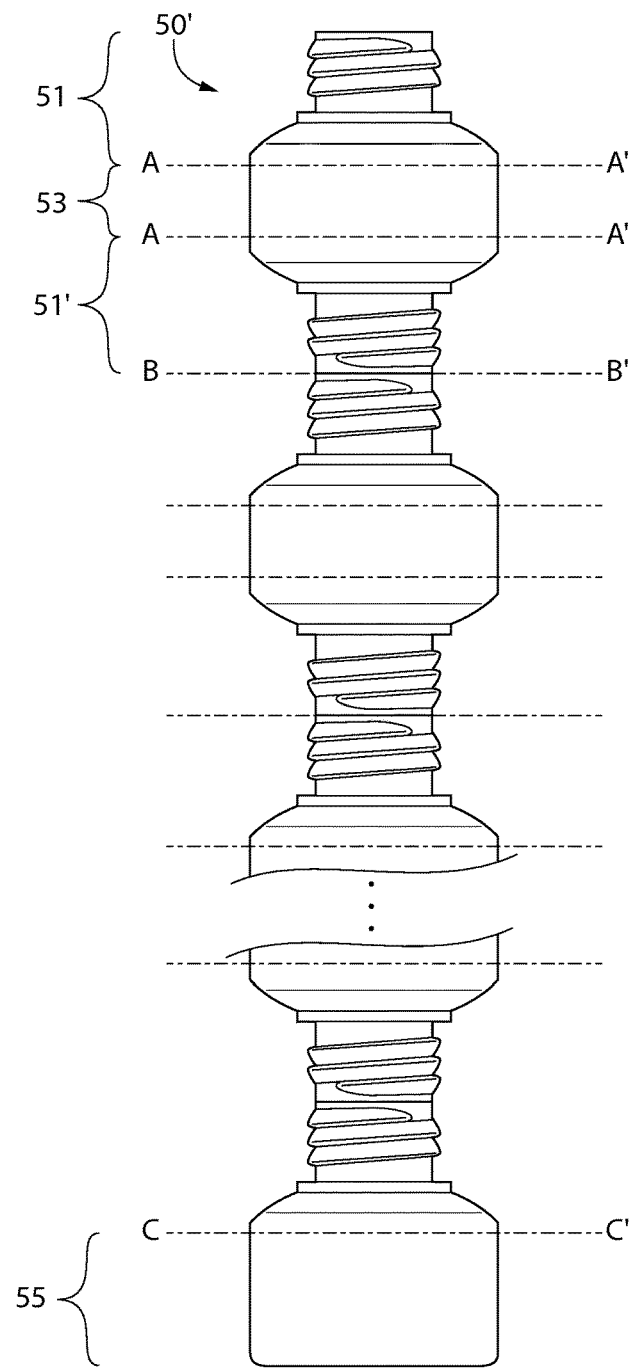
FIG. 5B is an illustration showing an example of an EBM mold of another embodiment that includes barrier-tube-shoulder-shaped cavities having different orientations and separated by spacer-shaped cavities.
Figure 5C:
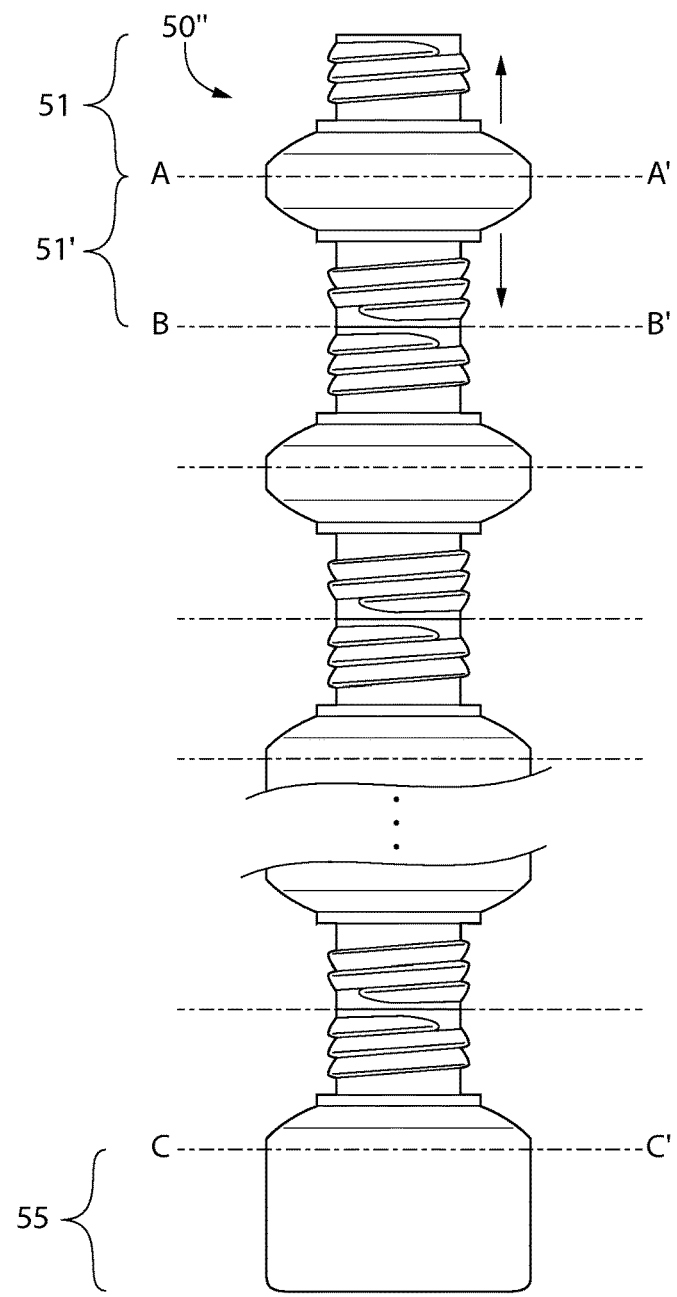
FIG. 5C is an illustration showing an example of an EBM mold of another embodiment that does not include spacer-shaped cavities between barrier-tube-shoulder-shaped cavities.

As shown in the example of FIG. 4, EBM mold 40 may include a first EBM mold 42 disposed next to a second EBM mold 44 and may include up to an $n^{th}$ EBM mold 46. Any of EBM molds 42, 44 and 46 may be identical or may be different from one another. For example, at least one of EBM molds 42, 44 and 46 may be selected from EBM molds 50, 50' and 50" which are illustrated in FIGS. 5A, 5B and 5C, respectively. EBM molds 50, 50', and/or 50" may include cavities of different sizes, shapes, and designs including different heights and/or different sized shoulders, different orientations including upward facing and downward facing barrier-tube-shoulder-shaped cavities, different shapes such as round or oval or rounded-corner rectangle cross sections, and additional features such as an engraving stamp portion in the form of a words or images such as logos.

As shown in FIG. 5A, EBM mold 50 may include some of the features of EBM mold 30 with barrier-tube-shoulder-shaped cavities having different sizes, shapes, and designs including, different heights, diameters, thread diameters and configurations such as adaptation for a snap bead closure or threaded closure (as shown). In mold 50, a first barrier-tube-shoulder-shaped cavity 51 may have a first size, for example, comprising first height $h_1$ and/or a first shoulder diameter $D_1$. The EBM mold 50 may also include a second barrier-tube-shoulder-shaped cavity 57 that has a second size, for example, comprising second height $h_2$ and/or a second shoulder diameter $D_2$. Additionally, EBM mold 50 may include a third barrier-tube-shoulder-shaped cavity 58 that has a third size, for example, comprising third height $h_3$ and/or a third shoulder diameter $D_3$. EBM mold 50 may further include an $n_{th}$ barrier-tube-shoulder-shaped cavity 59 that has an $n^{th}$ size, for example, comprising an $n^{th}$ height $h_n$ and/or a corresponding shoulder diameter. Spacer-shaped cavity 53 may separate the first barrier-tube-shoulder-shaped cavity 51 from the second barrier-tube-shoulder-shaped cavity 57. Spacer-shaped cavity 53' may separate the second barrier-tube-shoulder-shaped cavity 57 from the third barrier-tube-shoulder-shaped cavity 58. End spacer-shaped cavity 55 is located at an end of EBM mold 50 for accepting a closed-off end of the parison fed into the EBM mold 50.

As shown in FIG. 5B, EBM mold 50' may include some of the features of EBM mold 30. In mold 50, a first barrier-tube-shoulder-shaped cavity 51 may have a first orientation (as indicated by the upward pointing arrow). A second barrier-tube-shoulder-shaped cavity 51' may have a second orientation (as indicated by the downward pointing arrow). Spacer-shaped cavity 53 may separate the first barrier-tube-shoulder-shaped cavity 51 from the second barrier-tube-shoulder-shaped cavity 51' as indicated by the line A-A'. Alternating pairs of adjacent first and second barrier-tube-shoulder-shaped cavities 51' and 51 are oriented nozzle-shaped-end to nozzle-shaped-end as indicated by line B-B'. End spacer-shaped cavity 55 is located at an end of EBM mold 50 for accepting a closed-off end of the parison fed into the EBM mold 50'.

As shown in FIG. 5C, EBM mold 50" may include some of the features of EBM mold 30. In mold 50", a first barrier-tube-shoulder-shaped cavity 51 may have a first orientation (as indicated by the upward pointing arrow). A second barrier-tube-shoulder-shaped cavity 51' may have a second orientation (as indicated by the downward pointing arrow). In this embodiment there is no need for a spacer-shaped cavity to separate the shoulder-shaped cavities, thereby requiring less material for forming the extrusion blow molded barrier tube shoulders. Accordingly, line A-A' is shown as separating the first barrier-tube-shoulder-shaped-shaped cavity 51 from the second barrier-tube-shoulder-shaped cavity 51'. Alternating pairs of adjacent first and second barrier-tube-shoulder-shaped cavities 51' and 51 are shows nozzle-shaped-end to nozzle-shaped-end as indicated by line B-B'. End spacer-shaped cavity 55 is located at an end of EBM mold 50 for accepting a closed-off end of a parison fed into the EBM mold 50".

In an embodiment, an article may be provided. The article may be formed from a multi-layer laminated structure. In an embodiment, the article may be formed to have a shape defined by a mold cavity, such as the but not limited to any of the shapes described above for the cavities of molds 30, 40, 50, 50' or 50" illustrated in FIGS. 3A-5C. Thus, the article may include a multi-layer laminated structure defining a first barrier-tube-shoulder-shaped portion, a second barrier-tube-shoulder-shaped portion, and a cavity extending between the first barrier-tube-shoulder-shaped portion and the second barrier-tube-shoulder-shaped portion. The article may be formed from a multi-layer laminated structure such as that described above for multi-layer laminated structure 11. Accordingly, the multi-layer laminated structure of the article may have an outer layer, and an interdisposed layer between the inner layer and the outer layer, and the interdisposed layer may be a flavor barrier layer. The article's multi-layer laminated structure may further include a first wall thickness and a second wall thickness. The first wall thickness may be greater than the second wall thickness. For example, a thickness of the laminated structure defining the first barrier-tube-shoulder-shaped portion comprises the first wall thickness. The article's multi-layer laminated structure may further define a spacer-shaped-portion disposed between the first barrier-tube-shoulder-shaped portion and the second barrier-tube-shoulder-shaped portion. In an example, a thickness of the laminated structure defining the spacer-shaped-portion may comprise the second wall thickness. The article's first barrier-tube-shoulder-shaped portion may be oriented in the same direction as the second barrier-tube-shoulder-shaped portion. The article's first barrier-tube-shoulder-shaped portion may be oriented in an opposite direction than the second barrier-tube-shoulder-shaped portion. As discussed above, the flavor barrier layer may comprise at least one of high density polyethylene (HDPE), ethylene vinyl alcohol (EVOH) copolymer, cyclic olefin copolymer (COC), nylon or combinations thereof. In one example, the article may be formed by an extrusion blow-molding process as described below, but the article is not so limited and in other examples, the article may be formed according to other methods known in the art.

A process for extrusion blow molding barrier tube shoulders is illustrated in FIGS. 6A-6D. As shown, a multi-layer barrier laminated structure 62 is extruded in the form of a parison 64 by an extrusion blow molding machine 600. The parison 64 may include a closed end 66. As the parison is formed (i.e., as the multi-layer barrier laminated structure is extruded as a parison), its wall thicknesses may be controlled or varied. For example, some portions along the length of the parison 64 may comprise thicker walls while other portions may comprise thinner walls. The positioning of the parison 64 relative to the EBM mold may also be controlled. For example, as the multi-layer barrier laminated structure is extruded into the form of the parison 64, it may be positioned within the EBM mold such that its thicker walled portions and thinner walled portions are aligned with the shoulder-shaped cavities 61 and spacer-shaped cavities 63, respectively. The parison 64 may be transferred into EBM mold 60 until its closed end is aligned with or within the end spacer-shaped cavity 65. The thicker walled portions of the parison 64 that are blow molded into the barrier tube shoulders may have a thickness in the range of about 0.5 mm to about 2 mm, more specifically about 0.75 to about 1.5 mm, and more precisely about 0.8 mm to about 1 mm. The thinner walled portions of the parison 64 that are blow molded into the spacer-shaped cavities 63 that separate the barrier tube shoulders may have a thickness in the range of about 200 microns to about 500 microns, such as 250 microns to about 350 microns.

The extrusion blow molding machine 600 may include multiple extruders (not shown) to co-extrude different layer materials and form the multi-layer barrier laminated structure 62 in the form of the parison 64. The extrusion blow molding machine 600 may also include at least one blower 610.

EBM mold 60 may be, for example, any of the EBM molds 30, 40, 50, 50' or 50" as described above and may include any combination of features described for each of those EBM molds. At the very least, EBM mold 60 may include at least one barrier-tube-shoulder-shaped cavity 61, at least one spacer shaped-cavity 63 including an end spacer-shaped cavity 65 for accepting a closed-off end of the parison 64 at a closed end of the EBM mold 60.

Figures 6A, 6B:
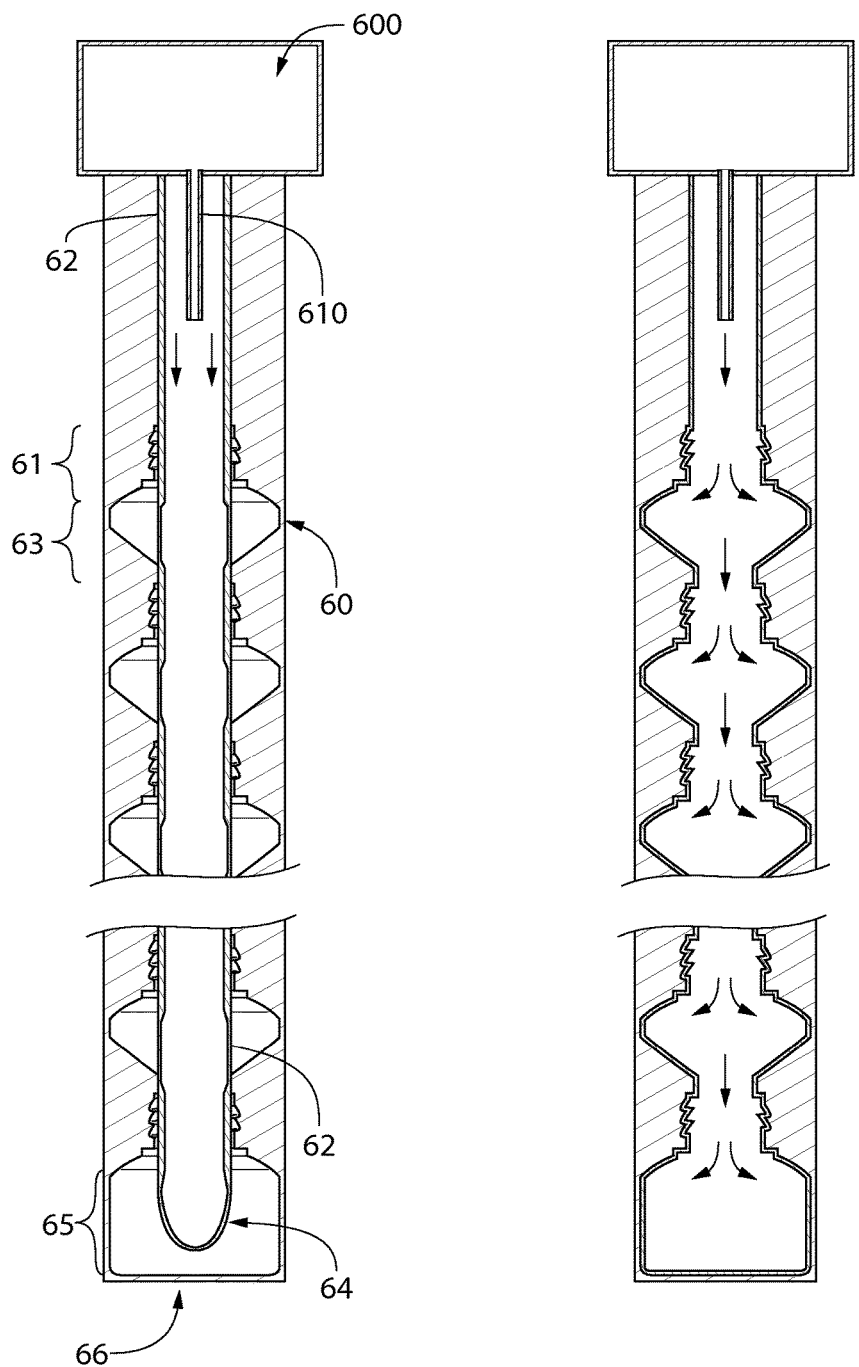
FIGS. 6A-6D show an example of a process for extrusion-blow-molding barrier tube shoulders.

As shown in FIG. 6B, air or another gas may be pumped or introduced into the hollow center of the parison 64 and the extruded multi-layer barrier laminated structure 62 making up the parison form 64 may be blow molded in the EBM mold 60 to produce a form comprising a plurality of tube barrier shoulder portions that may be interconnected to one another by the spacer portions. In the embodiment shown, the blower 610 is activated to inflate the parison 64 with air. The increase in air pressure forces the parison walls outward (as indicated by the arrows in FIG. 6B) until its sidewalls conform to the shape of the EBM mold cavity 60. In an embodiment, the EBM mold 60 may comprise two halves that are brought together while molding the parison 64 and then pulled apart to enable removing the formed structure (e.g., the formed barrier tube shoulders) disposed therein. The EBM mold 60 may be kept at a temperature that is lower than a glass transition temperature of the multi-layer barrier laminated structure such that the parison 64 "freezes" into a molded shape after conforming to the EBM mold cavity.

Figures 6C, 6D:
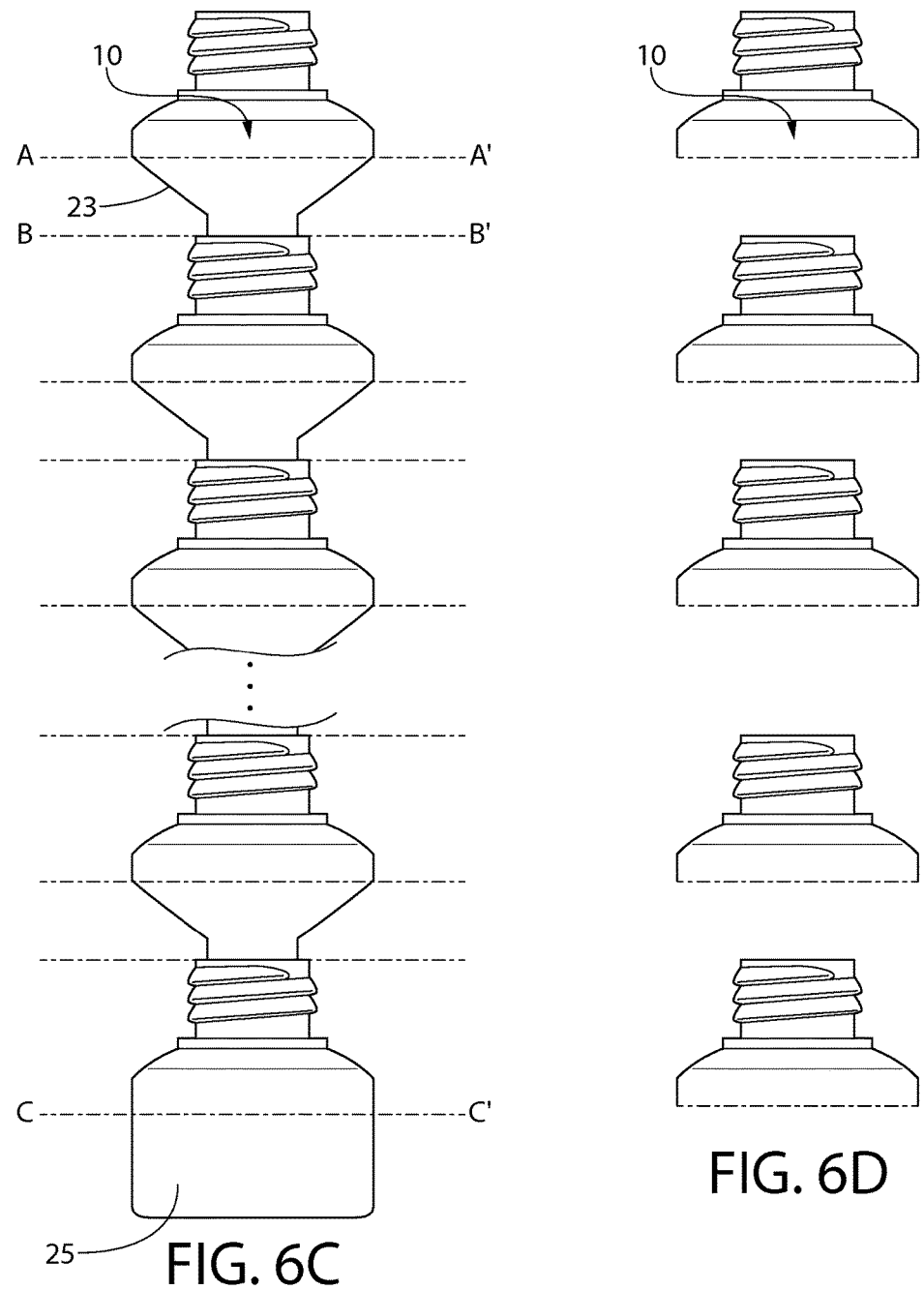

In the example shown in FIG. 6C, blow molding the multi-layer barrier laminated structure 62 in parison form produces a molded structure having at least one barrier tube shoulder 10, at least one spacer wall structure 23, and an end wall structure 25. After being ejected from the EBM mold 60, the molded structure is then trimmed to remove excess material, for example, by cutting along lines A-A', B-B' and so forth along the length of the molded structure. Additionally, excess portions of the molded structure may be removed by cutting along line C-C. What remains are the barrier tube shoulders 10 of the molded structure as shown in FIG. 6D. In other words, after blow molding, the extrusion blow molded tube barrier shoulders are separated/trimmed, for example by cutting off the spacers. The barrier tube shoulders 10 may then be attached to respective ones of tube bodies as discussed above with respect to FIG. 2. Individual extrusion blow molded barrier tube shoulders of the embodiments may have a trimmed weight (i.e., weight after trimming away from the molded structure) of about 0.8 g to about 3 g, specifically about 1 g to about 2.5 g, and more precisely about 1.3 g to about 1.8 g.

Figure 7:
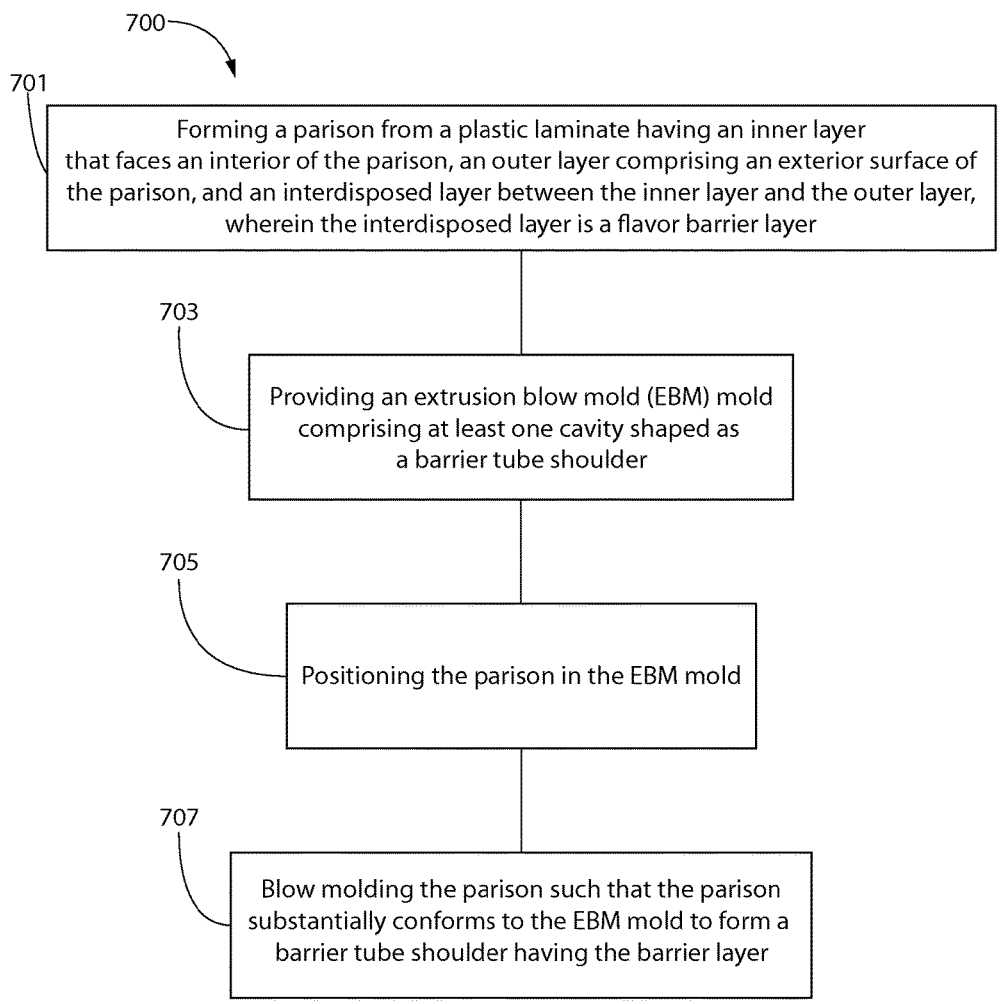
FIG. 7 is a flow chart of an example method for extrusion-blow-molding barrier tube shoulders.

FIG. 7 is a flow chart showing steps of a method 700 for making barrier tube shoulders. The method includes a step 701 of forming a parison from a plastic laminated structure having an inner layer that faces an interior of the parison, an outer layer comprising an exterior surface of the parison, and an interdisposed layer between the inner layer and the outer layer, wherein the interdisposed layer is a flavor barrier layer. The method also includes a step 703 of providing an extrusion blow molding (EBM) mold comprising at least one cavity shaped as a barrier tube shoulder, a step 705 of positioning the parison in the EBM mold, and a step 707 of blow molding the parison such that the parison substantially conforms to the EBM mold to form a barrier tube shoulder having the barrier layer.

Multi-Layer Barrier Laminated Structure

The multi-layer barrier laminated structure of the embodiments may include a flavor barrier material comprising ethylene vinyl alcohol copolymer (EVOH) coextruded within a moisture resin comprising high-density polyethylene (HDPE), and post-consumer materials such as reground polyethylene and/or post-consumer-recycled high-density polyethylene (PCR HDPE). In an example, the multi-layer barrier laminated structure may comprise layers of materials arranged in a configuration that includes: HDPE/adhesive/EVOH/adhesive/regrind PE (or PCR HDPE/HDPE (2% white pigment).

Ethylene vinyl alcohol copolymer (EVOH) and Cyclic Olefin Copolymer (COC) are two materials that function to minimize flavor loss and that may be used in various embodiments of the multi-layer barrier laminated structure. Accordingly, in an example, the multi-layer barrier laminated structure may comprise layers of materials arranged in a configuration that includes: HDPE/adhesive/COC/adhesive/regrind PE (or PCR HDPE/HDPE (2% white MB). EVOH is commonly used as an oxygen barrier in food packaging. It keeps air out and flavors in the package. EVOH is a highly transparent, weather resistant, oil and solvent resistant, flexible, moldable, recyclable, and even printable material. COC is an amorphous polymer. Typically COC material has a higher modulus than HDPE. COC has a high moisture barrier for a clear polymer along with a low absorption rate for flavors/fragrances. Some properties of COCs vary due to monomer content, e.g., the glass transition temperature, viscosity, and stiffness. TOPAS® COCs, available from the TOPAS Advanced Polymers GmbH and/or TOPAS Advances Polymers, Inc. are made from ethylene and norbornene. A general structure for a COC is represented by structure I below:

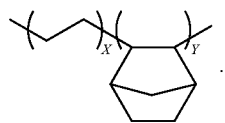

(I)

Embodiments described herein provide an extrusion blow molded barrier tube shoulder comprised of an extrusion blow molded multi-layer laminated structure that includes barrier material, for example, as a layer disposed between an innermost layer and an outermost layer. The barrier material in the barrier tube shoulder reduces the loss of flavor and/or fragrance molecules in product formulations and keeps active organic molecules within the tubes during the whole product shelf-life.

In various embodiments the flavor barrier material comprises a resin that may include at least one of HDPE, EVOH, and/or COC, including any combination of blends thereof. In an embodiment, the barrier material comprises at least one of EVOH, nylon m-xylenediamine (nylon MXDA or nylon MXD6 or another material having a similar processing temperature window to that of HDPE. In some embodiments, post consumer recycled HDPE can be used in the internal layers of the multi-layer laminated structure to provide for a more "sustainable" shoulder.

In an embodiment, the barrier layer in the multi-layer laminated structure comprises a tri-component blend of HDPE, EVOH and COC. In such a blend, the EVOH component of the barrier material comprises 5-20 wt %, the COC comprises 5-20 wt %, and the HDPE comprises 60-90 wt %. In an embodiment, the resin for the barrier layer of the multi-layer laminated structure includes a composition that consists essentially of HDPE, EVOH, and COC.

High Density Polyethylene (HDPE)

The HDPE used in the multi-layer barrier laminated structure of the embodiments can be any injection molding grade HDPE with a density from about 0.945 to 0.965 g/cm$^3$ (ASTM or ISO 1183 D 792), a melt index from about 4 to 25 g/10 min @190° C./2.16 kg (ASTM D 1238 or ISO 1133), and a melting point from about 115-135° C. (DSC method), such as Lyondell Basell Industries ALATHON® M5350 (available from Lyondell Basell Industries, Houston, Tex.), DOW™ DMDA 8007-NT7 (available from The Dow Chemical Company, Midland, Mich.), DOW™ Polyethylene 12450N (available from The Dow Chemical Company, Midland, Mich.) and the like.

Ethylene Vinyl Alcohol Copolymer (EVOH)

The EVOH used in the multi-layer barrier laminated structure of various embodiments can be a high barrier EVOH with a vinyl alcohol content of about 65 mol % and higher, an $O_2$ Transmission Rate @0% RH, 20° C. of 0.1-0.3 cm$^3$0.20 μm/m$^2$·day·atm (ISO 14663-2), and a melt Temperature of about 175-195° C. (ISO 11357), such as EVAL™ F (with 68 mol % of vinyl alcohol; available from Kuraray Co., Ltd., Houston, Tex.) and EVAL™ L (with 73 mol % of vinyl alcohol; available from Kuraray Co., Ltd., Houston, Tex.) series EVAL™ EVOH resins, for example EVAL™ LT171B, EVAL™ F104, and the like.

Cyclic Olefin Copolymer (COC)

The COC used in the multi-layer barrier laminated structure of various embodiments can be COC with a heat deflection temperature of about 130° C. and higher. The COC of the embodiments can have a water vapor permeability (at 23° C. and 85% relative humidity, DIN 53 122) of about 0.03 to 0.05 g·mm/m$^2$·d. The COC of the embodiments can have good water-repelling property with water absorption after immersion for 24 h/23° C. of about 0.01%, which is about ten times smaller than that of polycarbonate and poly(methyl methacrylate). An example is TOPAS® grade 6017 (available from Topas Advanced Polymers, Inc., Florence, Ky.).

Preferably, the tubes should be rugged and able to withstand the rigors of transport, temperature variation, and use by consumers. The tubes are preferably thin enough to be readily deformable, so the product inside (e.g., toothpaste) can be easily squeezed out of the tube, yet tough enough to withstand significant pressures in filling and in use. Preferably, the materials and manufacturing costs should be low, as packaging may constitute a significant fraction of the cost of goods for many products sold in dispensing tubes.

EXAMPLES

Example 1—Extrusion Blow Molding of a Multi-Layer Laminated Structure into a Barrier Tube Shoulder A unit cavity mold comprising one barrier-tube-shoulder-shaped cavity was made. A multi-layer laminated structure was extruded to form a parison. The multi-layer laminated structure had a structure defined by layers of HDPE/adhesive/EVOH/adhesive/regrind PE (or PCR HDPE)/HDPE (2% white MB). Thicknesses of the different layers were: 17/5/7/5/33/33 (in wt % of the total weight of the extruded multi-layer barrier laminated structure exiting an extruder). The multi-layer laminated structure in the form of a parison was introduced into the cavity and blow molded into a barrier tube shoulder. A flavor test was performed on the barrier tube shoulder with acceptable results.

While the present teachings have been illustrated with respect to one or more implementations, alterations and/or modifications may be made to the illustrated examples without departing from the spirit and scope of the appended claims. In addition, while a particular feature of the embodiments may have been disclosed with respect to only one of several implementations, such feature may be combined with one or more other features of the other implementations as may be desired and advantageous for any given or particular function. It will be appreciated that structural components and/or processing stages may be added or existing structural components and/or processing stages may be removed or modified. The processing stages or method steps described in the embodiments are not necessarily limited to the order in which they are presented or described. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. The term "about" indicates that the value listed may be somewhat altered, as long as the alteration does not result in nonconformance of the process or structure to the illustrated embodiment. Finally, "exemplary" indicates the description is used as an example, rather than implying that it is an ideal. Other embodiments of the present teachings will be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for making barrier tube shoulders, comprising:
    forming a parison from a multi-layer laminated structure having an inner layer that faces an interior of the parison, an outer layer comprising an exterior surface of the parison, and an interdisposed layer between the inner layer and the outer layer, wherein the interdisposed layer is a flavor barrier layer;
    providing an extrusion blow molding (EBM) mold comprising at least one cavity shaped as a barrier tube shoulder;
    positioning the parison in the EBM mold; and
    blow molding the parison such that the parison substantially conforms to the EBM mold to form at least one barrier tube shoulder having the barrier layer, and wherein the EBM mold further comprises at least one spacer-shaped cavity, and wherein blow molding the parison such that the parison substantially conforms to the EBM mold also forms a spacer wall structure.

2. The method of claim 1, further comprising removing the barrier tube shoulder from the EBM mold.

3. The method of claim 1, further comprising trimming the spacer wall structure from the barrier tube shoulder.

4. The method of claim 1, wherein the at least one cavity shaped as a barrier tube shoulder comprises a plurality of cavities shaped as a barrier tube shoulder and the at least one spacer-shaped cavity separates adjacent ones of the plurality of cavities shaped as a barrier tube shoulder.

5. The method of claim 1, wherein forming the parison comprises:
    forming a first wall thickness for a first portion of the parison and a second wall thickness for a second portion of the parison, wherein the first wall thickness is greater than the second wall thickness;
    and wherein blow molding the parison comprises:
    blow molding the second portion of the parison having the second wall thickness into the at least one spacer-shaped cavity.

6. The method of claim 1, wherein forming the parison comprises:
    forming a first wall thickness for a first portion of the parison and a second wall thickness for a second portion of the parison, wherein the first wall thickness is greater than the second wall thickness;
    and wherein blow molding the parison comprises:
    blow molding the first portion of the parison having the first wall thickness into at least one cavity shaped as a barrier tube shoulder.

7. The method of claim 1, wherein the EBM mold comprises a first cavity shaped as a barrier tube shoulder having a first size and a second cavity shaped as a barrier tube shoulder having a second size, wherein the first size is different from the second size.

8. The method of claim 1, wherein the EBM mold comprises a first cavity shaped as a barrier tube shoulder having a first design and a second cavity shaped as a barrier tube shoulder having a second design, wherein the first design is different from the second design.

9. The method of claim 1, wherein the at least one cavity shaped as a barrier tube shoulder comprises a nozzle portion and a shoulder portion.

10. The method of claim 1, wherein the EBM mold comprising at least one cavity shaped as a barrier tube shoulder comprises a plurality of cavities shaped as interconnected barrier tube shoulders.

11. The method of claim 10, wherein a first one of the plurality of cavities shaped as interconnected barrier tube shoulders is oriented in a first direction and a second one of the plurality of cavities shaped as interconnected barrier tube shoulders is oriented in a second direction opposing the first direction.

12. The method of claim 11, wherein the first one of the plurality of cavities shaped as interconnected barrier tube shoulders is separated from the second one of the plurality of cavities shaped as interconnected barrier tube shoulders by a spacer-shaped cavity.

13. The method of claim 10, wherein each of the plurality of cavities shaped as interconnected barrier tube shoulders comprises a nozzle portion and a shoulder portion; and
    wherein the cavities shaped as barrier tube shoulders are interconnected at the nozzle portions.

14. The method of claim 10, wherein a first one of the plurality of cavities shaped as interconnected barrier tube shoulders is larger than a second one of the plurality of cavities shaped as interconnected barrier tube shoulders.

15. The method of claim 1, wherein the multi-layer laminated structure comprises at least one of high density polyethylene (HDPE), polyethylene (PE), ethylene vinyl alcohol (EVOH) copolymer, cyclic olefin copolymer (COC), or mixtures thereof.

16. The method of claim 1, wherein at least one of the innermost layer and outermost layer comprises high density polyethylene (HDPE).

17. The method of claim 1, wherein the flavor barrier layer comprises at least one of high density polyethylene (HDPE), ethylene vinyl alcohol (EVOH) copolymer, cyclic olefin copolymer (COC), nylon or combinations thereof.

\* \* \* \* \*